United States Patent
Otsuka et al.

(10) Patent No.: US 7,587,586 B2
(45) Date of Patent: Sep. 8, 2009

(54) METHOD, PROGRAM, AND SYSTEM FOR SETTING UP COMMUNICATION DATA FOR DEVICES AND SUPPORTED APPLICATIONS

(75) Inventors: Junichi Otsuka, Suwa (JP); Toshiyuki Sugimoto, Suwa (JP); Hiroki Nakazawa, Suwa (JP); Masakazu Honma, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 729 days.

(21) Appl. No.: 11/221,513

(22) Filed: Sep. 8, 2005

(65) Prior Publication Data
US 2006/0055963 A1 Mar. 16, 2006

(30) Foreign Application Priority Data
Sep. 10, 2004 (JP) ............................. 2004-263369

(51) Int. Cl.
G06F 13/10 (2006.01)
G06F 9/24 (2006.01)
G06F 15/177 (2006.01)
G06F 3/00 (2006.01)

(52) U.S. Cl. ............................. 713/1; 713/2; 713/100; 710/8

(58) Field of Classification Search .................. 713/1, 713/2, 100
See application file for complete search history.

(56) References Cited

U.S. PATENT DOCUMENTS 6,487,522 B1 * 11/2002 Smith et al. ................. 702/186
7,133,141 B1 * 11/2006 Abi-Saleh ................... 358/1.13
2002/0095310 A1   7/2002 Kobayashi et al.
2003/0184781 A1 * 10/2003 Laughlin .................... 358/1.13
2003/0200361 A1  10/2003 Dogra et al.
2004/0085563 A1   5/2004 Nishimura

FOREIGN PATENT DOCUMENTS

| JP | 10-301723 | 11/1998 |
|---|---|---|
| JP | 2002132512 | 5/2002 |
| JP | 2002-207690 | 7/2002 |
| JP | 2003-099220 | 4/2003 |

OTHER PUBLICATIONS

Marge Rowell, "Winsock FTP", created Aug. 7, 2002, last updated Sep. 10, 2002, retrieved from http://www.wellesley.edu/Computing/wsftp/wsftp.html.*

* cited by examiner

*Primary Examiner*—Chun Cao
*Assistant Examiner*—Ji H Bae

(57) ABSTRACT

A communication setup program eliminates the need for setting communication data common to multiple applications individually for each application. The communication setup program configures communication data that is reflected by the applications when each application is loaded, and provides a device selection module for selecting a target communication device from among one or more devices setup on the computer; a related application extraction module for extracting related applications that support the selected device from among a plurality of applications installed on the computer; a communication data setup module for configuring the communication data used by related applications to communicate with the selected device; and a communication data ID output module for providing a communication data ID for referencing the configured communication data to the extracted applications.

12 Claims, 5 Drawing Sheets

METHOD, PROGRAM, AND SYSTEM FOR SETTING UP COMMUNICATION DATA FOR DEVICES AND SUPPORTED APPLICATIONS

RELATED APPLICATION

Japanese Application No. 2004-263369 is hereby incorporated by reference in its entirety.

BACKGROUND OF THE INVENTION

1. Field of the Invention

The present invention relates to a communication setup method and program for uniformly setting communication parameters common to multiple applications capable of supporting a particular device shared by the applications. Other aspects of the invention relate to a startup method and program, and an application startup method and system.

2. Description of the Related Art

In order to print from any one of multiple applications conventionally installed on a computer, the printing setup function of each application must be used to setup printing from that application. See, for example, JP-A-2003-99220, particularly the discussion of the prior art. Even applications, which register information in a printer, such as writing printer firmware or storing graphics in the printer, must have and use a communication setup function to enable communication with the printer.

This is described more fully below using by way of example a first application for rewriting printer firmware and a second application for registering graphics in the printer as applications that are installed on the computer for registering information in a printer_A supported by both applications.

To rewrite the firmware in printer_A and then store a graphic in printer_A, the first application must first load, select the target printer (printer_A) and open a communication channel with printer_A, then rewrite the firmware. The second application then loads, selects the target printer (printer_A) and opens a communication channel with printer_A, and then stores the graphic in the printer. Each application thus cannot complete the specified process unless each application separately sets up communication with the addressed device. The user must also separately configure each application to communicate with the same device, and this is obviously tedious.

SUMMARY OF THE INVENTION

The present invention in its various forms solves the foregoing problem by advantageously eliminating the need to individually setup communication for each application that supports a common device.

According to one aspect of the invention, a communication setup program for setting communication data for an application that is loaded. When executed by a computer or other instruction-processing device, the program provides: a device selection input module for receiving selection of a target device from among one or more devices accessible by the computer; a related application extraction module for extracting each application that supports the selected target device from among a plurality of applications installed on the computer; a communication data setup input module for receiving the communication data for communicating with the selected target device, the received communication data being stored in a storage medium together with a communication data ID; and a communication data ID output module for providing the communication data ID to each extracted application when that application loads.

In another aspect, the invention involves a communication setup method that runs on a computer to set communication data for an application when the application loads. The method causes the computer to execute the steps of: storing supported device information denoting devices supportable by each application installed on the computer; receiving selection of a target device from among one or more devices accessible by the computer; extracting each application that supports the selected target device based on the supported device information; receiving the communication data for communicating with the selected target device; storing the communication data with a communication data ID; and supplying the communication data ID to each extracted application when that application loads.

When the device to be used (communicated with) by the application is specified, each application (collectively, the related applications) that can support the selected device is extracted from among the installed applications, and the communication data (parameters) enabling the extracted applications to communicate with the selected device are set for all supporting applications. It is therefore not necessary for the user to set common communication data (parameters) used for the same device for each of the applications. Based on the communication data identified by the communication data ID supplied to the application when the application loads, each application can automatically configure itself for communication with the device.

Furthermore, because the related applications are the extracted applications that support a common device, there is no danger of the applications being loaded to reflect communication data (parameters) for a device not supported by the application. Communication parameters for an unsupported device will also not be set by mistake.

There is also no need to incorporate a conventional communication setup function in each application, thereby simplifying the application development process and shortening development time.

The related applications are those applications that support the same device and are selected from among a larger group of applications installed on the computer. Handling the related applications in accordance with the present invention, eliminates the need to set communication parameters common to the same device for each of multiple applications.

The related application extraction module can determine whether an application supports the selected device (that is, whether an application is a related application) based on information provided by each application (information related to the devices supported by the application), or the communication setup program can store information related to the devices supported by each application and reference this information to identify the related applications. In other words, the supported device information can be provided by either the application or the communication setup program.

In this case the communication setup program further preferably causes the computer to provide a displayed dialog box for selecting the target device by means of the device selection input module and setting the communication data by means of the communication data setup input module. Using a dialog box simplifies selecting the target device with which an application is to communicate and setting the communication parameters.

Preferably, the dialog box a startup button for starting each application extracted by the related application extraction module, and the communication setup program further causes the computer to function as a startup mechanism for detecting operation of a startup button (e.g., a mouse click of the button) and, in response thereto, loading the corresponding application to reflect the communication data. By providing a startup button in the dialog box for setting the communication data, an application can be quickly loaded reflecting the communication data by simply clicking the corresponding startup button. Preferably, the startup buttons for loading applications that support the selected device are enabled, and the buttons for loading applications that do not support the selected device are disabled. Enabling and disabling start up buttons in this manner prevents the erroneous loading of applications that do not support the selected device.

Yet further preferably, when an application is installed, that application stores supported device information denoting the devices that can be supported by the application in an application data storage area. The related application extraction module then references this application data storage area to extract the related applications from among the larger group of applications that stored supported device information in the application data storage area.

During the installation process, each application thus stores supported device information indicating which devices are supportable by the application in an application data storage area; that is, the application provides the supported device information. As a result, new applications can be added to the system without needing to change the communication setup program. In other words, the communication setup program searches the application data storage area to extract the applications for which the communication data can be uniformly defined. Because the supported device information for each additional application is stored in the application data storage area when the application is installed, this data is also referenced, and all related applications capable of using the same communication data can be reliably extracted.

Furthermore, because the related applications to be extracted are limited to those applications that stored supported device information in the application data storage area, applications that are simply installed on the computer and do not store the supported device information are excluded from the extracted applications.

In accordance with another aspect of the invention, a startup program for loading applications reflecting communication data settings is provided. The startup program, when executed by a computer, provides: a communication data setup module for configuring communication data for a plurality of applications installed on the computer; a displayed dialog box for configuring the communication data by means of the communication data setup module, the displayed dialog box having a startup button for starting each application; and a startup mechanism for loading an application to reflect the communication data by supplying the communication data to the application when the corresponding startup button is operated, e.g., by clicking with a mouse.

In another aspect, the invention involves an application startup method that runs on a computer having a plurality of applications installed thereon. The application startup method causes the computer to execute steps of: displaying a dialog box for configuring communication settings for use by a plurality of applications, the dialog box having a startup button for starting each application; storing communication data for the plurality of applications based on the communication settings entered in the dialog box; and loading at least one of the applications reflecting the communication data based on operation of the corresponding startup button(s), such as by clicking the button(s) with a mouse.

This aspect of the present invention eliminates the need to set the same communication data individually for each application, and by using a dialog box makes configuring the communication data simple. Furthermore, because the dialog box for setting the communication data includes one or more startup buttons, the applications can be quickly loaded reflecting the communication data by clicking on the corresponding startup buttons with a mouse, for example. The application development process and development time are also shortened because incorporating a conventional communication setup function in each application is thus not necessary.

Other objects and attainments together with a fuller understanding of the invention will become apparent and appreciated by referring to the following description and claims taken in conjunction with the accompanying drawings.

DESCRIPTION OF THE PREFERRED EMBODIMENTS

Preferred embodiments of the present invention are described below with reference to the accompanying figures. When the user (operator) specifies the device with which an application is to communicate in a computer having multiple installed applications, the present invention extracts the applications that support that device (also referred to herein as "related applications") and then sets up communication data for use by each of the extracted applications. A tedious configuration process can thus be greatly simplified because common communication settings do not need to be individually set for each application. The present invention is described below using a printer by way of example as a commonly supported device.

Figure 1:
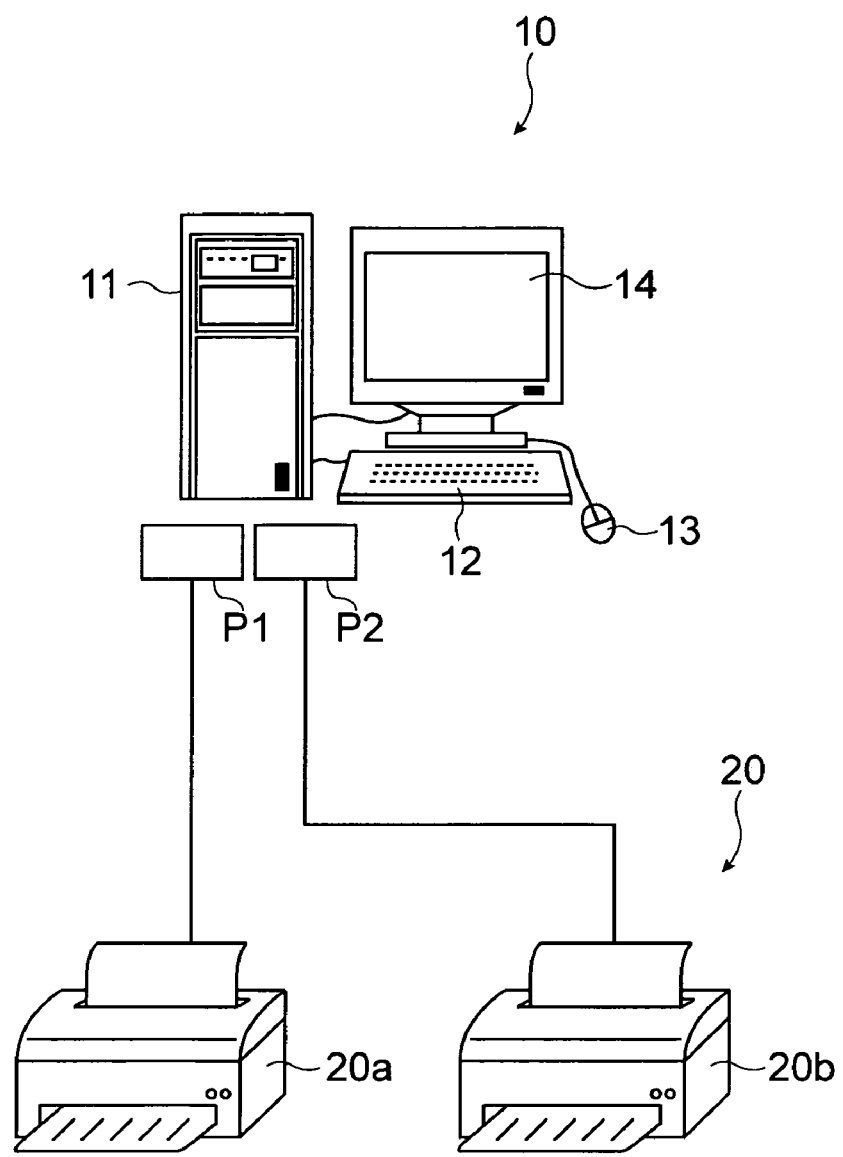
FIG. 1 shows the arrangement of a system according to a preferred embodiment of the present invention.

FIG. 1 shows the system configuration of a first embodiment of the present invention. The host terminal 10 is connected to printer_A 20a and printer_B 20b through two communication ports P1 and P2. The communication ports P could be, for example, serial (a COM port), parallel (an LPT port), USB, Ethernet, or other type of communication port. The host terminal 10 is typically a personal computer, and is composed of a computer 11, keyboard 12, mouse 13, and display 14. Various applications and tools such as a communication setup and application loading program (a communication setup program and an application loading program) for loading the applications and setting up communication are installed on the computer 11.

"Application" as used herein refers to software, which is designed for a specific purpose, such as an image editing program and/or database program, and runs under an operating system (OS). Examples of applications for registering information in a printer 20 include applications for rewriting the firmware of a printer 20, applications for storing graphics in a printer 20, and applications for setting software switches stored in memory in the printer 20.

Figure 2:
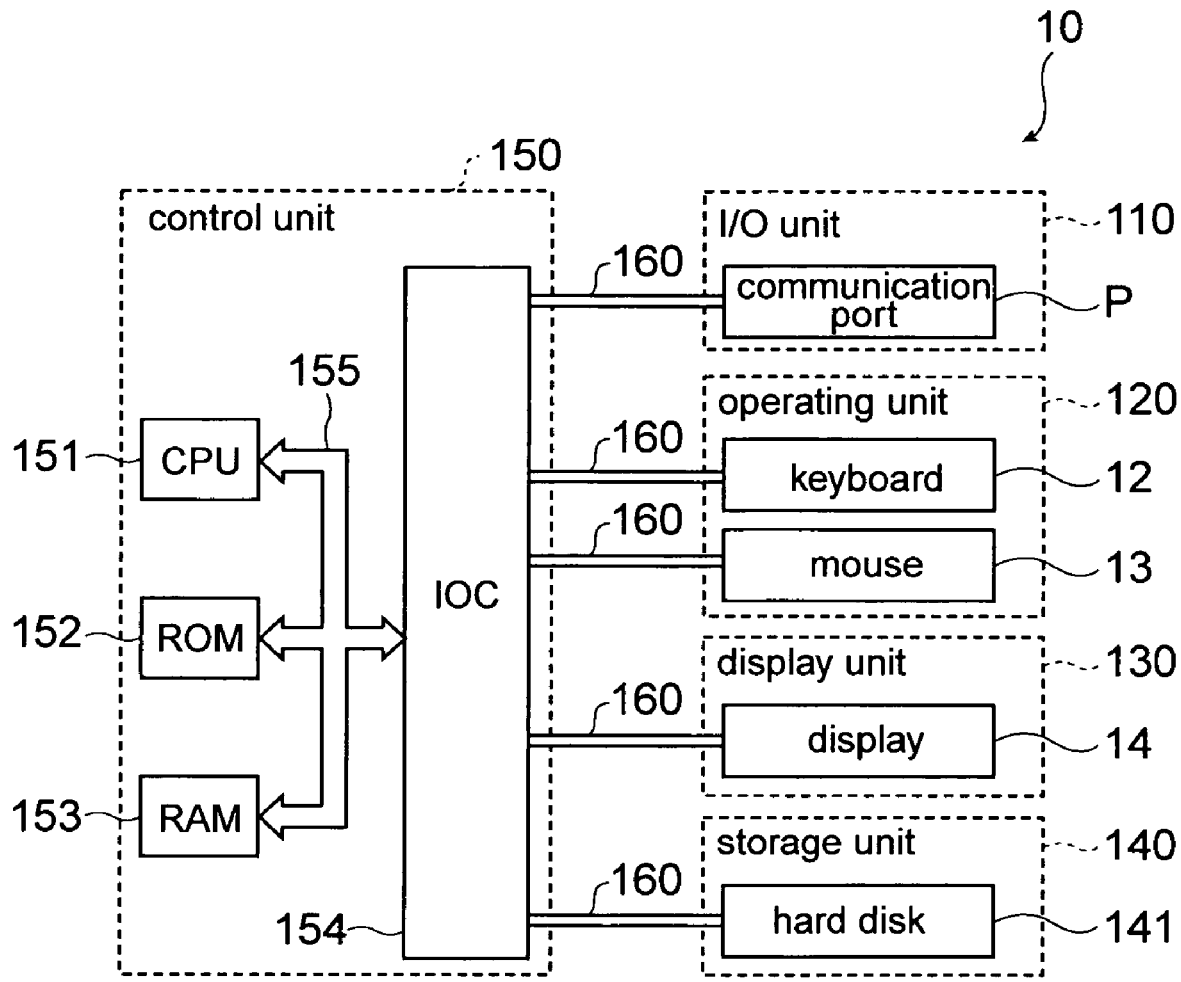
FIG. 2 is a block diagram of the host terminal of the system of FIG. 1.

FIG. 2 is a block diagram showing the control configuration of the host terminal 10. The host terminal 10 has an input/output unit 110, operating unit 120, display unit 130, storage unit or medium 140, and control unit 150. The control unit 150 communicates with the other units 110 to 140 over a system bus 160.

The I/O unit 110 has a plurality of communication ports P, and controls the communication interface to the printer 20 connected to each communication port P.

The operating unit 120 includes the keyboard 12 and mouse 13 used by the user to select the printer 20 to communicate with and enter information.

The display unit 130 is composed of a display 14 for presenting information and the dialog box 50 generated by the communication setup and application loading program.

The storage unit 140 is composed of a hard disk drive 141, which stores the operating system, applications, print control programs (printer drivers), communication setup and application loading program. Storage unit 140 further includes a registry, which includes an application data storage area 31 for storing information related to each application, such as supported device information related to the printers 20 supported by each application, and a communication parameter storage area 32 for storing communication parameters (communication conditions) generated from the settings entered in the dialog box 50.

The control unit 150 includes CPU 151, ROM 152, RAM 153, and an input/output controller (IOC) 154, which communicate with each other over an internal bus 155. ROM 152 stores the BIOS, control program, and control data processed by the CPU 151. RAM 153 temporarily stores the communication setup and application loading program and applications read from hard disk drive 141, as well as application data, communication parameters, and other data, and is used as the working memory for the control processes run by the CPU 151.

IOC 154 is preferably composed of logic circuits built from gate arrays and custom ICs for complementing the function of the CPU 151 and handling interface signals with the peripheral circuits. The IOC 154 can thus pass input data (such as the communication parameter settings and application loading commands) from the keyboard 12 and mouse 13, and control data (including responses and error signals) received from the printer 20 through the communication port directly or after processing to the internal bus 155, and in conjunction with the CPU 151 can either directly pass or process and then pass data and control signals output from the CPU 151 to the system bus 155.

The CPU 151 thus runs the control program stored in ROM 152 to receive signals and data from the internal units of the host terminal 10 via the IOC 154, and process data and run programs stored in RAM 153. The CPU 151 also outputs signals and data over the IOC 154 to the internal units of the host terminal 10 to control operation, including running the communication setup and application loading program (thus controlling the communication setup for the applications and control application loading).

Control based on the communication setup and application loading program is described next with reference to FIGS. 3 and 4. Such control is exercised primarily by the CPU 151 based on information sharing between the communication setup and application loading program and the other applications.

Figure 3:
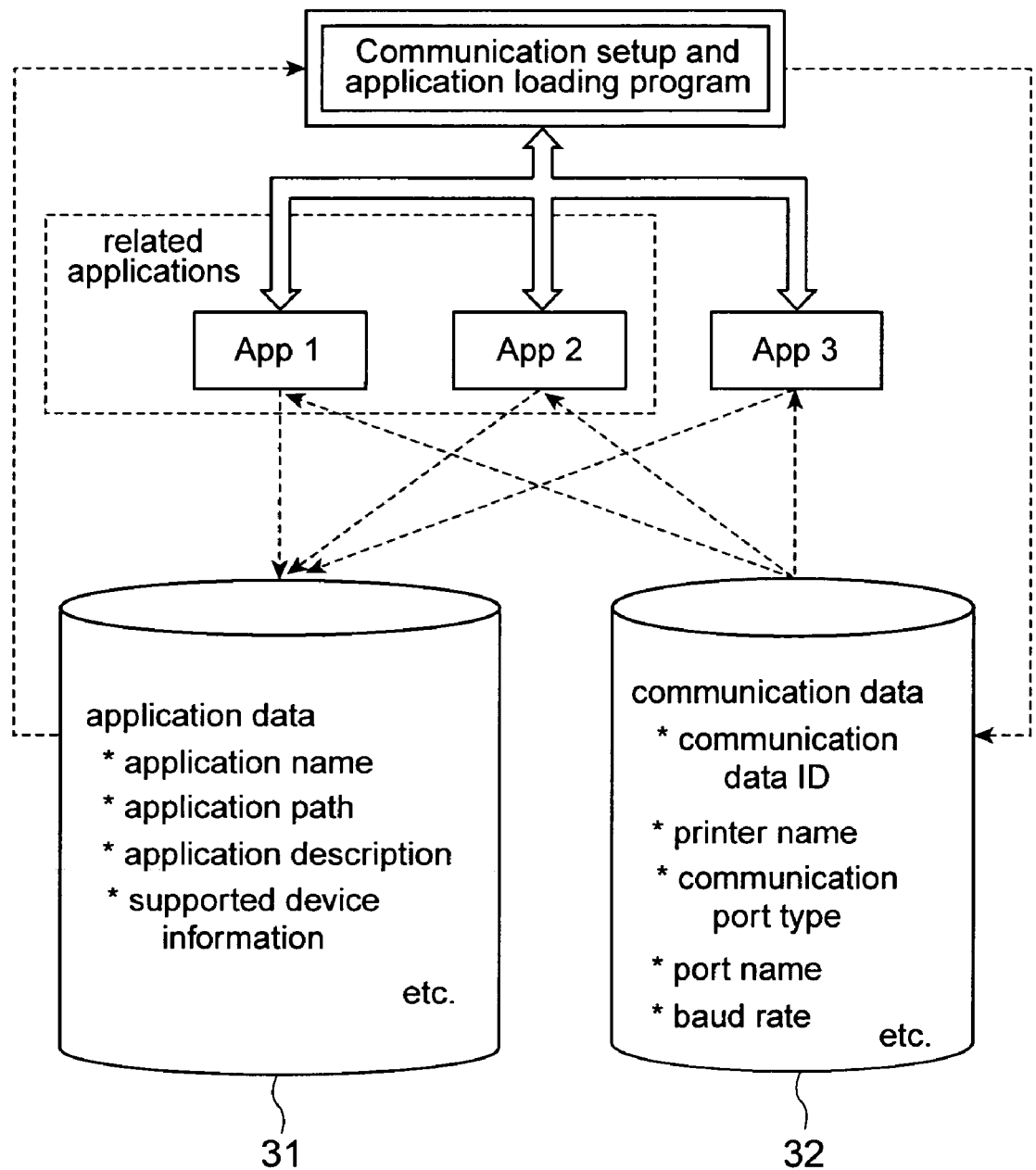
FIG. 3 illustrates the relationship between the communication setup and startup program and the applications.
Figure 4:
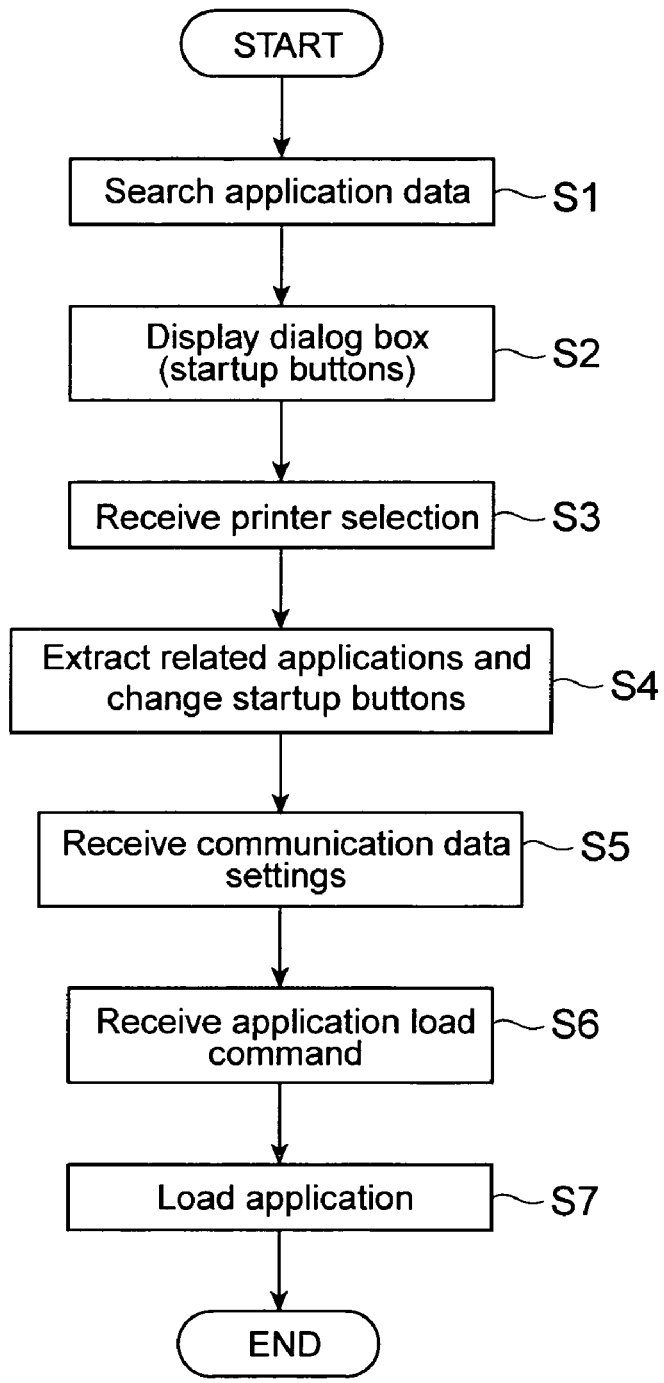
FIG. 4 is a flow chart of the communication setup method and application startup method.

As shown in FIG. 3, the communication setup and application loading program is linked to each of the plural applications installed on the host terminal 10 (stored on the hard disk drive 141) based on the application data stored in the application data storage area 31 and the communication data stored in the communication parameter storage area 32. Three applications, App1, App2, and App3, are installed on the host terminal 10 in this example of the invention. Here, App1 and App2 support printer_A 20a, and application App3 supports printer_B 20b.

The application data is the information relating to each application that is stored in the application data storage area 31 (registry) when each application is installed according to the specifications of the communication setup and application loading program. More specifically, the application data includes the name of the application, the application path, application description, and the supported device information denoting what printer 20 the application supports. An application could support a plurality of printers. Related applications are extracted based on this supported device information as more fully described below.

Figure 5:
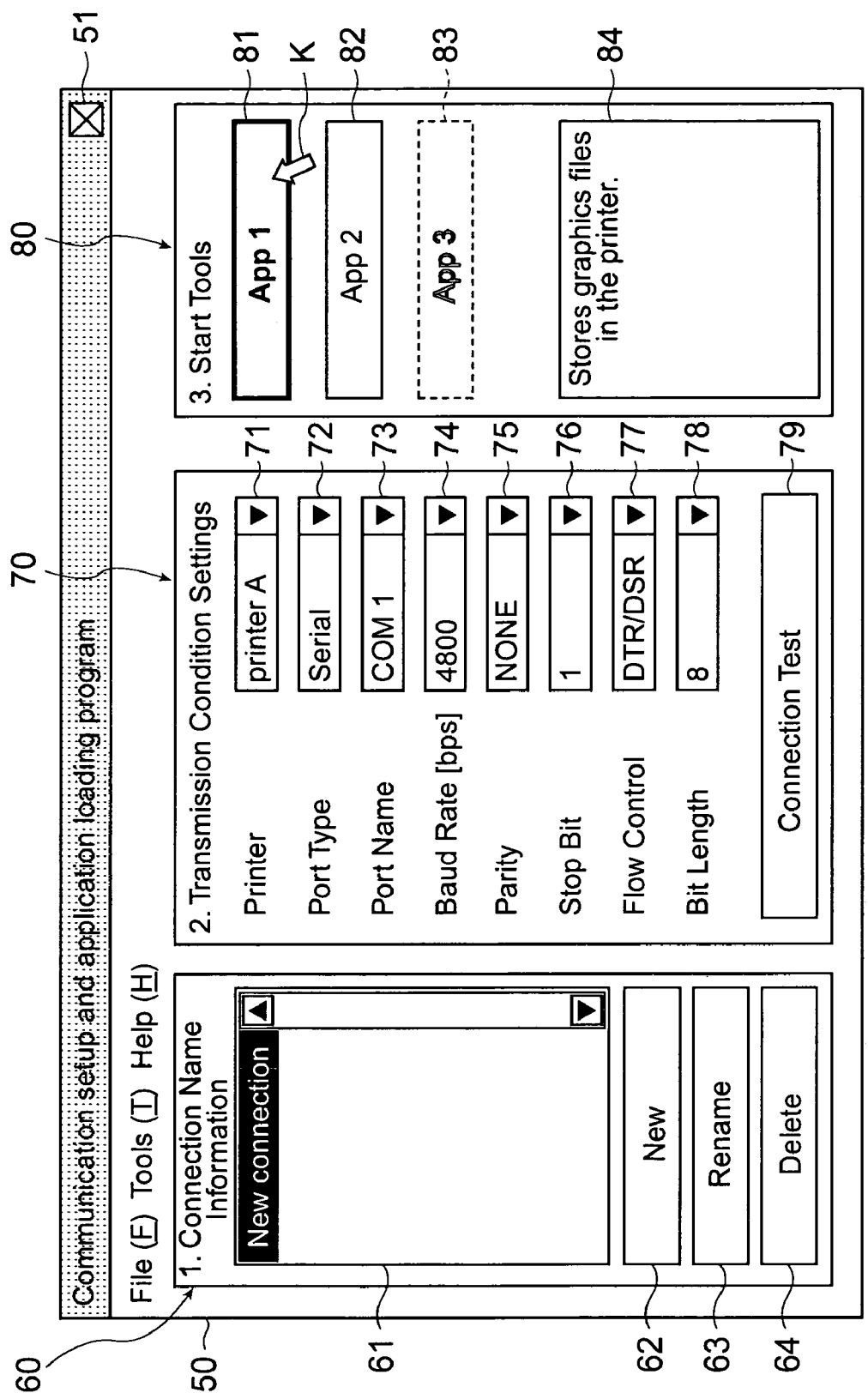
FIG. 5 shows an example of a dialog box used in the communication setup and startup program.

The communication data is the information stored by the communication setup and application loading program in the communication parameter storage area 32 (registry) based on the settings input to the communication parameters block 70 of the dialog box 50 shown in FIG. 5. The communication data may include the printer name, communication port type, the port name, and the baud rate. Each communication data record is identified by a communication data ID, and the communication setup and application loading program supplies the communication data ID as a parameter to the application when an application is loaded.

The communication setup and application loading program links applications together by sharing this application data and communication data. More specifically, the communication setup and application loading program extracts the related applications supporting the same printer 20 (App1 and App2 in this example) as a result of each application App1, App2, and App3 storing the supported device information in the application data storage area 31. The communication data for the supported device (printer 20) is set by the communication setup and application loading program and stored in the communication parameter storage area 32. Based on the communication data ID supplied by the communication setup and application loading program when an application is loaded, each of the related applications can get the corresponding communication data from the communication parameter storage area 32 and use the retrieved communication data for communication.

To use related applications (e.g., App1 and App2 in this example), the user first sets the communication data using the communication setup and application loading program, and then loads the individual applications (e.g., App1 and App2) using the communication setup and application loading program. When loading the applications, the user does not need to use the communication setup function of each related application (e.g., App1 and App2) in order to enable communication with the supported device because such applications automatically read the communication data identified by the communication data ID from the communication parameter storage area 32 and set up communication with the supported device accordingly. More specifically, the present invention enables the user to set the communication data once for all related applications (e.g., App1 and App2 in this example) by using the communication setup and application loading program, and thus does not need to set the communication data individually for each application. App1 and App2 are extracted as the applications to communicate with the printer because printer_A 20a is selected and App1 and App2 support that printer in this example. If printer_B 20b is selected, only application App3 is extracted for communication with that printer according to this example.

The communication setup and application loading program (communication setup method and application loading method) is described next with reference to FIG. 4.

When the user loads the communication setup and application loading program, the program searches the application data storage area 31 to retrieve all applications for which supported device information is stored in the application data storage area 31 (S1). Based on the result, a dialog box 50 presenting buttons for loading each of the applications (App1, App2, App3 in this example) is then presented on the display 14 (S2).

When the user then selects a particular device to be used (printer_A 20a in this example) (S3), any button for loading an application (App3 in this example) that does not support the selected device is then disabled (S4). In a typical graphical user interface, for example, each button for loading an application that does not support the selected device is grayed out as denoted by dotted line 83 in FIG. 5, thus indicating to the user that the button is inactive and that the corresponding application (e.g., App3) cannot be loaded. In addition, the buttons for loading applications that do support the selected device (related applications) are enabled. Thus, buttons 81 and 82 are enabled in this example. Moreover, the related applications (e.g., App1, App2) are extracted from among the installed applications (e.g., App1, App2, App3) based on the supported device information stored in application data storage area 31. Thus, in this example, because App1 and App2 support printer_A 20a, which is the selected device, startup buttons 81 and 82 for those respective applications are enabled, and because App3 does not support printer_A 20a, the startup button 83 for application App3 is disabled.

Based on the settings entered in the dialog box 50 by the user, the communication data for the selected printer 20 (printer_A 20a) is then configured (S5). When the user then clicks one of the selectable application loading buttons (App1 button 81 or App2 button 82), thereby asserting a command to load the corresponding application (S6), the selected application is loaded (S7). The communication setup and application loading program supplies the communication data ID of the selected printer 20 to the application, the application loads the required communication data from the communication parameter storage area 32 based on the communication data ID when the application loads, and the application is thus configured for communication with the printer 20.

A dialog box 50 for specifying the communication parameters and loading applications is described next with reference to FIG. 5, which shows the dialog box 50 after the particular device, e.g., printer_A, is selected (step S3 in FIG. 4) and the communication parameters have been set (S5 in FIG. 4), that is, just before one of the application buttons is pressed to load a desired application (S6 in FIG. 4).

As shown in FIG. 5, this dialog box 50 presents a graphical user interface (GUI) having a connection name information block 60 for creating a new communication data profile or loading an existing profile from a list of connection names; a communication parameters block 70 for selecting a device, e.g., printer_A, setting the communication parameters, and testing the connection; and a startup tools block 80 for loading applications and presenting a description of the selected application.

The connection name information block 60 contains a list box 61 for displaying a list of communication data IDs assigned to communication data profiles (communication conditions); a "New" button 62 for creating a new communication data profile; a "Rename" button 63 for changing the name (ID) of an existing communication data profile; and a "Delete" button 64 for deleting an existing communication data profile. When a communication data ID listed in the list box 61 is selected, the communication parameters stored under that ID are displayed in the communication parameters block 70. As a result, selecting a communication data ID enables selecting a desired printer 20 (step S3 in FIG. 4). If the "New" button 62 is clicked instead of selecting a connection profile in the list box 61, the printer_A addressed by the new profile can be selected by selecting the desired printer from the combination box 71 in the communication parameters block 70 after the "New" button 62 is clicked.

The communication parameters block 70 contains a combination box 71 for selecting the printer 20 addressed by the application, combination box 72 for selecting the communication port type (e.g., serial port, printer port, USB port), a combination box 73 for selecting the port name (e.g., COM1, COM2, LPT1, LPT2, AUTO), a combination box 74 for selecting the baud rate, a combination box 75 for selecting whether to use a parity check, a combination box 76 for selecting the stop bit, a combination box 77 for selecting the flow control method (e.g., DTR/DSR, RTS/CTS), a combination box 78 for selecting the bit length, and a Connection Test button 79 for testing the communication conditions set up using combination boxes 71 to 78. The communication parameters are then written to communication parameter storage area 32 (step S5 in FIG. 4) based on the data entered in the communication parameters block 70 (the data selected using combination boxes 71 to 78).

Which combination boxes 73 to 78 are enabled and the content displayed in those boxes differ according to the communication port type selected by combination box 72. For example, if a serial communication port is selected, combination boxes 73 to 78 are displayed, but only combination box 73 is enabled if a parallel or USB port is the selected communication port type (the other combination boxes 74 to 78 are disabled and thus grayed out). The port names available for selection in combination box 73 are COM1 and COM2 if a serial port is selected, LPT1 and LPT2 if a parallel port is selected, and AUTO if a USB port is selected.

Buttons 81 to 83 for loading applications, and a text box 84 for displaying a description of the application, are presented in the startup tools block 80.

The name of the corresponding application (App1, App2, App3) is displayed as the button label for each of the application buttons 81 to 83. As previously noted, in this example the application button 83 for starting App3 is grayed to indicate that the button is disabled. In this example, therefore, the startup tools block 80 presents application buttons 81 to 83 for starting all of the plural applications for which application data is stored in the application data storage area 31, but only the application buttons 81 and 82 for loading the related applications (e.g., App1, App2) supporting the selected printer 20 (printer_A 20a) are enabled (clickable). Note that all of the application buttons are displayed in the same way (that is, selectable as denoted by application button 82 for loading application App2) before a device (e.g., printer) is selected (step S3 in FIG. 4).

When the cursor K is moved over one of the application buttons using the mouse 13, a description of the corresponding application, such as the function of the program, is displayed in the text box 84. In the example shown in FIG. 5 the cursor K is positioned over the button 81 for loading application App1, and a description of the function of application App1 is therefore displayed in the text box 84.

The dialog box 50 is thus arranged so that the communication parameters for using a selected device (e.g., printer)

can be set and an application supporting the selected printer can be loaded using the presented controls from top to bottom or left to right. The user can also intuit how to enter the necessary information without reading an operating manual.

Furthermore, because application buttons 81 to 83 for loading related applications are displayed in the startup tools block 80, the user can easily load the desired application.

In addition, because the application buttons are displayed based on the application data, when a new related application is added, a button for loading the new program will be automatically displayed in the startup tools block 80 without the need for modifying or updating the communication setup and application loading program.

The communication data stored in the communication parameter storage area 32 is modified, if necessary, and stored whenever a new connection profile is created using the New button 62 in FIG. 5, a communication data ID is changed using the Rename button 63 in FIG. 5, a communication data profile (ID) is deleted using the Delete button 64 in FIG. 5, before the connection test is run when the Connection Test button 79 is clicked, before an application is loaded using any of the application buttons 81 to 83, and when the communication setup and application loading program is quit such as by clicking the [X] box 51 shown at the top right corner of the dialog box 50 in FIG. 5.

Furthermore, the communication data ID is passed to the related applications when each application is loaded. When an application is loaded, the application therefore gets the necessary communication data from the communication parameter storage area 32 based on the communication data ID passed to the application during the startup procedure. Therefore, if the communication port type is changed from serial to USB, for example, and the App1 button 81 is then clicked, the change in communication port type is already reflected in the connection profile and thus known to the application. The communication data defined in the communication parameters block 70 will therefore be automatically used by the application when the application is loaded without the user needing to click or forgetting to click an OK button to update the communication data.

Although preferred embodiments of the present invention have been described with reference to the accompanying drawings, various changes and modifications will be apparent to those skilled in the art, in view of the foregoing description. Such changes and modifications are included within the scope of the present invention to the extent that they fall within the spirit and scope of the appended claims.

For example, buttons for loading applications other than the related applications supporting the selected device are displayed but disabled as indicated by the button for App3 in the dialog box 50 shown in FIG. 5, but these buttons could be simply not displayed.

The applications are also described as writing their own application data (supported device information) to application data storage area 31 during the installation process, but the supported device information could be written by the communication setup and application loading program instead of by the individual applications. In this case extraction of the related applications is based on information (such as a table containing device names and the names of applications supporting each device) stored by the communication setup and application loading program. More specifically, the communication setup and application loading program references a previously compiled table stored by the program to extract and read from a hard disk the applications of the application names corresponding to the one or more application names supporting the specified device. This arrangement enables applications (such as existing applications) other than applications developed according to the specifications of the communication setup and application loading program (that is, applications programmed to store application data in the application data storage area 31) to be configured for communication (supplied with the communication data ID and communication data settings) and loaded by the communication setup and application loading program. Both the method described in the foregoing embodiments and this alternative method can, of course, be used in tandem. In this case, the method of the present invention is rendered compatible with both existing applications and new applications.

The communication setup and application loading program of the present invention can also be provided stored on a recording medium, which may be any suitable medium for storing such program. Examples of such recording media include flash ROM, memory cards (e.g., Compact Flash, SD memory cards, memory sticks), Compact Discs, media, magneto-optical disks, DVD media, and floppy disks.

The system design, such as whether the device is a display device, fax machine, scanner, or other electronic device, and the screen design (specifically the layout of the dialog box) can also be varied in many ways without departing from the scope of the present invention.

What is claimed is:

1. A recording medium carrying a communication setup program for setting communication data for an application, the communication setup program, when executed by a computer, providing:

a device selection input module configured to receive selection of a target device from among one or more devices accessible by the computer;

a related application extraction module configured to extract each application that supports the selected target device from among a plurality of applications installed on the computer;

a communication data setup input module configured to receive communication data for communicating with the selected target device, the received communication data being stored in a storage medium together with a communication data ID;

a communication data ID output module configured to provide the communication data ID to each extracted application when that application is loaded; and a displayed dialog box, functionally associated with the device selection input module and the communication data setup input module, for selecting the target device and setting the communication data, the dialog box including an enabled start button for loading each application that supports the selected target device and a disabled start button for preventing the loading of any application that does not support the selected target device.

2. A recording medium carrying a communication setup program for setting communication data for an application, the communication setup program, when executed by a computer, providing:

a device selection input module configured to receive selection of a target device from among one or more devices accessible by the computer;

a related application extraction module configured to extract each application that supports the selected target device from among a plurality of applications installed on the computer;

a communication data setup input module configured to receive communication data for communicating with the selected target device, the received communication data being stored in a storage medium together with a communication data ID; and a communication data ID output module configured to provide the communication data ID to each extracted application when that application is loaded, wherein, when each application is installed, that installed application stores supported device information denoting devices supportable by that application in an application data storage area; and the related application extraction module references the application data storage area to extract the related applications from among the applications which stored the supported device information in the application data storage area.

3. A recording medium carrying a startup program for loading applications, the startup program, when executed by a computer, providing:

a communication data setup module for configuring communication data for a plurality of applications installed on the computer;

a displayed dialog box for configuring the communication data by means of the communication data setup module, the displayed dialog box having an enabled startup button for starting each application that supports a selected target device; and a startup mechanism for loading each application that supports the selected target device to reflect the communication data based on operation of the corresponding startup button and a disabled start button for preventing the loading of any application that does not support the selected target device.

4. A communication setup method adapted to run on a computer to set communication data for an application when the application loads, the communication setup method causing the computer to execute steps of:

storing supported device information, denoting one or more configured devices supportable by each application installed on the computer;

receiving selection of a target device from among the one or more devices accessible by the computer;

extracting each application that supports the selected target device based on the supported device information;

receiving communication data for communicating with the selected target device;

storing the communication data with a communication data ID;

providing a graphical interface that includes an enabled start button for loading each extracted application and a disabled start button for preventing the loading of any application that does not support the selected target device; and supplying the communication data ID to each extracted application when that application loads.

5. An application startup method adapted to run on a computer on which a plurality of applications are installed, the application startup method causing the computer to execute steps of:

selecting a target device from among a plurality of devices accessible by the computer;

extracting each application that supports the selected target device;

displaying a dialog box for configuring communication settings for use by each of the extracted applications, the dialog box having a startup button for starting each extracted application and a disabled start button for preventing the loading of any application that does not support the selected target device;

storing communication data for the extracted applications based on the communication settings entered in the dialog box; and loading each of the extracted applications by means of the corresponding startup button.

6. A recording medium carrying an application startup system, comprising:

a communication data input unit for receiving communication data for communicating with a device;

a communication data ID input unit for receiving a communication data ID identifying specific communication data;

a communication data storage unit for storing the communication data with the communication data ID; and an application startup unit for supplying the communication data ID to an application that supports the device, and for loading the application;

a related application extraction unit for extracting applications for which the application data is stored in the application data storage unit; and a startup command input unit for receiving a startup command for loading the extracted application, the startup command input unit having a startup button for each application;

wherein the startup command input unit enables startup buttons for applications which can support the device identified by the communication data ID received by the communication data ID input unit, and disables startup buttons for other applications.

7. The recording medium of claim 6, wherein the application loaded by the application startup unit configures the communication settings of the application by reading communication data corresponding to the communication data ID from the communication data storage unit.

8. The recording medium of claim 6, wherein the application startup system further comprises:

a device selection input unit for selecting of the device as a target communication device;

a related application extraction unit for extracting each application that supports the selected device; and a startup command input unit for accepting a startup command for loading the extracted applications;

wherein the application startup unit loads each application specified by the startup command received by the startup command input unit.

9. The recording medium of claim 6, wherein the application startup system further comprises:

an application data storage unit for storing application data including supported device information denoting devices supportable by the applications.

10. An application startup method, comprising steps of:

(a) receiving communication data for communicating with a device;

(b) receiving communication data ID identifying the communication data;

(c) storing the communication data with the communication data ID in a storage medium; and (d) supplying the communication data ID received in step (b) to an application that supports the device while loading the application;

(e) storing in the storage medium application data including supported device information denoting devices supportable by each of a plurality of applications including the application specified in step (d);

(f) extracting each of the plurality of applications for which the application data is stored in the storage medium;

(g) displaying for each of the plurality of applications a startup button for starting that extracted application, enabling the startup button for each extracted application that supports the device identified by the communication data ID received in step (b); and (h) receiving operation of one or more of the enabled start up buttons to load the corresponding application or applications.

11. The application startup method of claim 10, wherein the application loaded in step (d) configures the communication settings of the application by reading communication data corresponding to the communication data ID from the storage medium.

12. The application startup method of claim 10, further comprising the steps of:

(i) receiving selection of the device as a target communication device;

(j) extracting the application that supports the device identified by the communication data ID received in step (b) or specified in step (i); and (k) receiving a startup command for loading the extracted application;

wherein, in step (d), the application specified by the startup command received in step (k) is loaded.

* * * * *